United States Patent
Moll et al.

(10) Patent No.: US 12,101,537 B2
(45) Date of Patent: Sep. 24, 2024

(54) IMAGE SENSOR APPARATUS OF A CAMERA FOR DETECTING LIGHT

(71) Applicant: AUDI AG, Ingolstadt (DE)

(72) Inventors: Tobias Moll, Ingolstadt (DE); Markus Klug, Ingolstadt (DE)

(73) Assignee: AUDI AG, Ingolstadt (DE)

(*) Notice: Subject to any disclaimer, the term of this patent is extended or adjusted under 35 U.S.C. 154(b) by 148 days.

(21) Appl. No.: 17/999,182

(22) PCT Filed: Apr. 21, 2021

(86) PCT No.: PCT/EP2021/060371
§ 371 (c)(1),
(2) Date: Nov. 17, 2022

(87) PCT Pub. No.: WO2021/233633
PCT Pub. Date: Nov. 25, 2021

(65) Prior Publication Data
US 2023/0209154 A1    Jun. 29, 2023

(30) Foreign Application Priority Data

May 19, 2020    (DE) .................. 10 2020 113 591.2

(51) Int. Cl.
*H04N 23/12*    (2023.01)
*G03B 33/12*    (2006.01)
(Continued)

(52) U.S. Cl.
CPC ............ *H04N 23/12* (2023.01); *G03B 33/12* (2013.01); *H04N 23/55* (2023.01); *H04N 25/134* (2023.01); *G02B 5/32* (2013.01)

(58) Field of Classification Search
CPC ...... H04N 23/12; H04N 23/55; H04N 25/134; H04N 23/16; H04N 23/45; H04N 23/11;
(Continued)

(56) References Cited

U.S. PATENT DOCUMENTS 5,764,389 A    6/1998    Grinberg et al.
6,330,113 B1 *  12/2001    Slagle ................ G02B 27/1073
                                                  348/338
(Continued)

FOREIGN PATENT DOCUMENTS

KR    1020190075719    *   1/2019    ............... H04N 9/07
KR    20190075719 A        7/2019
WO    WO 2008091534 A1    7/2008

OTHER PUBLICATIONS

International Search Report and Written Opinion, mailed Jul. 23, 2021, for International Application No. PCT/EP2021/060371, 11 pages.
International Preliminary Report on Patentability, mailed Dec. 1, 2022, for International Application No. PCT/EP2021/06037, 15 pages.

*Primary Examiner* — Hung H Lam
(74) *Attorney, Agent, or Firm* — Seed IP Law Group LLP (57) ABSTRACT

The invention relates to an image sensor apparatus of a camera for detecting light. The image sensor apparatus comprises at least a first and a second sensor element and a carrier medium, wherein the carrier medium has a first and second input coupling region and a first and second output coupling region, wherein the first input coupling region has a first deflection structure which input couples light at a first given wavelength into the carrier medium in the direction of the first output coupling region, wherein the second input coupling region has a second deflection structure which input couples light at a second given wavelength into the carrier medium in the direction of the second output coupling region, wherein the first output coupling region has a first output coupling deflection structure which output couples the transmitted light from the carrier medium onto the first sensor element and wherein the second output (Continued)

coupling region has a second output coupling deflection structure which output couples the light onto the second sensor element.

10 Claims, 4 Drawing Sheets

(51) Int. Cl.
   *H04N 23/55* (2023.01)
   *H04N 25/13* (2023.01)
   *G02B 5/32* (2006.01)

(58) Field of Classification Search
   CPC ........ G03B 33/12; G03B 33/04; G03B 33/16; G02B 5/32; G02B 27/4272; G02B 27/0037; G02B 27/1013; G02B 27/126
   See application file for complete search history.

(56) References Cited

U.S. PATENT DOCUMENTS

| | | | |
|---|---|---|---|
| 7,106,526 B2* | 9/2006 | Tomita | H04N 23/55 |
| | | | 396/335 |
| 7,110,034 B2 | 9/2006 | Suda | |
| 9,971,160 B2 | 5/2018 | Sohn | |
| 10,156,681 B2* | 12/2018 | Waldern | G02B 6/0016 |
| 2003/0179457 A1 | 9/2003 | Dobashi et al. | |
| 2004/0004668 A1 | 1/2004 | Namazue et al. | |
| 2004/0183938 A1 | 9/2004 | Campbell | |
| 2015/0042850 A1 | 2/2015 | Bilcu et al. | |
| 2015/0277375 A1* | 10/2015 | Large | G03H 1/0248 |
| | | | 359/34 |
| 2022/0230454 A1* | 7/2022 | Klug | B60R 11/04 |

* cited by examiner

IMAGE SENSOR APPARATUS OF A CAMERA FOR DETECTING LIGHT

BACKGROUND

Technical Field

This disclosure relates to an image sensor apparatus of a camera for detecting light, in particular light in the visible and infrared spectral range.

Description of the Related Art

An image sensor apparatus, in particular for camera sensors, is usually an extensive array of individual sensor elements, that is pixels, which generate image information by means of the image points and corresponding intensity or brightness values.

The individual sensor elements (image points, pixels) inherently can only record intensity signals, no colors. Therefore, color filters are overlaid on pixels for color recordings, which respectively transmit only a certain color, for example red, green and blue, whereby a certain brightness value can then be associated with this color. However, since only one color filter can be associated with each sensor element, that is with each pixel, this means that only a third of the pixels and thereby a reduced resolution is theoretically available for each color as well as each pixel only receives a part of the light according to color filter. The most usual method for distributing the red, green and blue color filters is the so-called Bayer pattern. Here, green occurs twice as often as red or blue. Since each pixel, as described, can only measure a concrete brightness value, the two lacking color values are interpolated for this pixel position, whereby a complete red, green and blue signal is present for each pixel and thereby image point.

If one wishes to have more image information, that is a higher resolution, the pixel number or the number of the sensor elements of the image sensor apparatus has to increase. Hereto, either the image sensor apparatus has to become larger in area or else the individual pixels have to become smaller with consistent area.

Today, the present image information plays an increasingly important role, for example for the image processing. For increasingly precise and sophisticated applications, more and more image information is required. This applies to still images, that is for photos, as well as to moving images, that is videos.

Since the sensor sizes are usually fixed, for example due to present lens standards, an enlargement of the image sensor apparatus often is not an option. Instead, more and more pixels are accommodated on a consistent area. This for example entails the problem of image noise. In simplified manner, it can be said that the smaller an area of a sensor element, the less light (photons) this area can collect and the more severe is the resulting image noise.

From WO 2008/091534 A1, a method, an appliance and a system are provided, which provide a holographic layer as microlenses and color filter arrangement in an image sensor From U.S. Pat. No. 5,764,389 A, holographic color filters for display applications are known.

BRIEF SUMMARY

Embodiments of the present invention provide an improved image sensor apparatus, in which more light can be provided for sensor elements.

An image sensor apparatus for detecting light is provided according to embodiments of the invention. In particular, the image sensor apparatus can be an image sensor apparatus for a camera for detection of light depending on color. The image sensor apparatus includes at least a first and a second sensor element, which are formed to generate a respective intensity signal from detected light, a carrier medium, which is arranged in front of the first and the second sensor element, wherein the carrier medium is formed as a light guide and comprises at least a first and a second input coupling region and at least a first and a second output coupling region. The first input coupling region comprises a first deflection structure, which is formed to couple light with a first preset wavelength, which is incident on the first input coupling region from an environment, into the carrier medium towards the first output coupling region, wherein the second input coupling region comprises a second deflection structure, which is formed to couple light with a second preset wavelength, which is incident on the second input coupling region from the environment, into the carrier medium towards the second input coupling region. Further, the carrier medium is formed to transfer the light coupled in via the input coupling regions to the output coupling regions by internal reflection, wherein the first output coupling region is arranged in front of the first sensor element and the second output coupling region is arranged in front of the second sensor element, and wherein the first output coupling region comprises a first output coupling deflection structure, which is formed to couple the transferred light with the first preset wavelength, which is incident on the first output coupling region, out of the carrier medium onto the first sensor element, and wherein the second output coupling region comprises a second output coupling deflection structure, which is formed to couple the transferred light with the second preset wavelength, which is incident on the second output coupling region, out of the carrier medium onto the second sensor element.

In other words, light with a preset wavelength is transferred to the sensor element, which is to detect an intensity signal for the preset wavelength, via a respective input coupling region of a carrier medium, wherein electromagnetic radiation is meant with light, which is preferably in the visible and/or infrared spectral range. The first and the second sensor element can be arranged next to each other and preferably be a part of a sensor element array. This means that the first and the second sensor element are sensors of an image sensor of the camera. In particular, the sensor elements can be photodiodes. The first and the second input coupling region can have a larger area than a sensor element such that more light can be collected for detection. The respective input coupling region can for example be arranged above the respectively other sensor element and collect the preset wavelength to pass it to the appropriate sensor element. This means that the preset first wavelength, which would impinge on the second sensor element, is for example coupled into the carrier medium from the first input coupling region via the first deflection structure and is passed to the first output coupling region by internal reflection, where it impinges on the first sensor element provided for the preset first wavelength. In particular, only the second input coupling region or the first and the second input coupling region can be arranged above the first sensor element. Alternatively, none of the two input coupling regions is arranged above the first sensor element such that the light is passed to the first sensor element from another region of the carrier medium. The same applies to the second sensor element and an arrangement of the first and/or the second input coupling region in front of this sensor element.

If the first and the second sensor element are extensively arranged next to each other, with internal reflection within the carrier medium, it is meant that the light is passed parallel to a sensor element surface to be able to couple out the preset wavelength at the location determined by the output coupling region.

For example, the carrier medium or light guiding medium can include a glass plate or glass pane, which is formed as a light guide. That is, the carrier medium can forward light by internal reflection, in particular by total reflection, in particular similar to a glass fiber cable. The input coupling region and an output coupling region are arranged on the carrier medium. The carrier medium quasi carries the input coupling region and the output coupling region.

For input coupling the light, the input coupling region comprises the mentioned deflection structure. It can for example be formed in the form of an optical grating, also termed diffraction grating. The deflection structure is formed to couple light, which is incident on the input coupling region from the environment, into the carrier medium. In this context, input coupling means that the deflection structure deflects or redirects the light from the environment such that it penetrates a volume of the carrier medium and is internally reflected there on at least one interface of the carrier medium. The carrier medium is formed to transfer the light coupled in via the input coupling region by internal reflection to the output coupling region. If the transferred light now impinges on the output coupling region, the output coupling deflection structure of the output coupling region can finally couple the transferred light out of the carrier medium. That is, the output coupling deflection structure can deflect or redirect the transferred or forwarded light in particular such that the light does no longer reflect on the interface of the carrier medium in impinging on the deflection structure, but is instead coupled out of the carrier medium and thus can exit the carrier medium. In some instances, the light of the respective preset wavelength proceeds parallel to the sensor elements after input coupling.

The respective deflection structures can be formed as a diffraction structure or refraction structure, as an interference structure, grating structure, as a lens system or mirror. In particular, the deflection structures can each be formed as a holographic-optical element (HOE) (or abbreviated holographic element), which can deflect light with a preset wavelength at a preset angle.

In some instances, the image sensor apparatus can also include a computing device, which is formed to generate an image, in particular a color image, from the respective intensity signal of the detected light.

By embodiments of the invention, the advantage arises that more light can be provided to each sensor element since light can be collected from an enlarged area and passed to the respective sensor element. Hereby, a resolution of the image sensor apparatus can for example be increased without augmenting image noise.

An embodiment provides that the respective deflection structures are formed as a holographic element with at least one optical grating, in particular a volume holographic grating or a surface holographic grating.

An optical grating, also termed diffraction grating, as well as the mode of operation and production method thereof, is generally known. Basically, an optical grating can be formed as a structure periodic at least in sections, so-called grating structures, in a substrate. By way of the grating structure, an optical grating can induce a light guidance by the physical effect of diffraction, as it is for example known from mirrors, lenses or prisms. If light is incident, that is if light beams are incident, on the optical grating, wherein the incident light beams in particular satisfy the Bragg equation, the light beams are diffracted or deflected by the optical grating. Thus, the light guidance can in particular be effected by interference phenomena of the light beams diffracted by the optical grating. The deflection structure of the input coupling region or output coupling region can correspondingly also be referred to as diffraction structure.

Advantageously, an optical grating can be formed direction-selective or angle-selective with respect to the incident light. Thus, only light, in particular a portion of the light, which is incident on an optical grating from a predetermined direction of incidence, for example at a predetermined angle, can be deflected. Light, in particular a portion of the light, which is incident on the optical grating from another direction, is preferably not deflected or the less the greater the difference to the predetermined direction of incidence. Thus, that light portion, which deviates from the predetermined direction of incidence or optimum direction of incidence, can propagate through the substrate with the optical grating in unimpeded manner.

Additionally or alternatively, an optical grating can also be formed wavelength-selective or frequency-selective. Thus, only light, in particular a first portion of the light, with a predetermined wavelength can be deflected or diffracted at a certain diffraction angle by the optical grating. Light, in particular a second portion of the light, with a wavelength different from the predetermined one is preferably not deflected or the less the greater the difference to the predetermined wavelength. Thus, the second light portion, which deviates from the predetermined wavelength or optimum wavelength, can propagate through the substrate with the optical grating in unimpeded manner. Thereby, for example of polychromatic light, which impinges on the optical grating, at least a monochromatic light portion can be split off. Advantageously, the deflection effect is maximum for the optimum wavelength and declines towards longer and shorter wavelengths, for example according to a Gaussian bell, or becomes weaker. In particular, the deflection effect only acts on a fraction of the visible light spectrum and/or in an angular range of less than 90 degrees.

A production of an optical grating can in particular be effected by way of exposure of a substrate, thus for example in photolithographic or holographic manner. In this context, the optical grating can then also be referred to as holographic or holographic-optical grating. Two types of holographic-optical gratings are known: surface holographic gratings (briefly: SHG) and volume holographic gratings (briefly: VHG). In a surface holographic grating, the grating structure can be generated by optically deforming a surface structure of the substrate. By the changed surface structure, impinging light can be deflected, for example reflected. Examples for surface holographic gratings are so-called sawtooth or blaze gratings. In contrast thereto, the grating structure can be incorporated in the entire volume or a partial region of the volume of the substrate in volume holographic gratings. Surface holographic gratings and volume holographic gratings are usually frequency-selective.

As the material for the said substrate for incorporating an optical grating, glass, for example quartz glass, in particular a photosensitive glass, is particularly suitable. Alternatively, a polymer, in particular a photopolymer, or a foil, in particular a photosensitive foil, for example of plastic or organic substances, can also be used. For using such substrates for the image sensor apparatus, it should additionally be noted that the material, in particular in substrate form, has light wave guiding characteristics. Substrates, which comprise a deflection structure for diffracting light, for example in the form of an optical grating, can also be referred to as holographic-optical elements. With such holographic-optical elements, the characteristics of conventional lenses, mirrors and prisms can in particular be reproduced. Advantages of holographic-optical elements are in that they can be formed more lightweight, substantially flatter due to the not required curvature and transparent at the same time in contrast to the conventional optical elements manufactured of glass or plastic.

A further embodiment provides that at least a third sensor element and a third input coupling region with a third deflection structure, which is formed to couple light with a third preset wavelength into the carrier medium towards a third output coupling region, are provided, wherein the third output coupling region comprises a third output coupling deflection structure, which is formed to couple the transferred light with the third preset wavelength, which is incident on the third output coupling region, out of the carrier medium onto the third sensor element, wherein the third output coupling region is arranged in front of the third sensor element. In other words, the image sensor apparatus can comprise at least three sensor elements, that is three pixels, wherein each sensor element is responsible for a preset wavelength. By the three input coupling regions, these preset wavelengths can be collected over a large-area region from the environmental light and forwarded to the appropriate sensor element. The three sensor elements can in particular be a part of an image sensor, which is constructed of a periodic juxtaposition of these three sensor elements. It can for example also be provided that a first sensor element, two second sensor elements and a third sensor element are arranged in a 2×2 matrix of sensor elements, which form a part of an image sensor of the image sensor apparatus, wherein this matrix can periodically repeat such that the entire image sensor results.

In some instances, it is provided that the first preset wavelength is in a red color spectrum, the second preset wavelength is in a green color spectrum and the third preset wavelength is in a blue color spectrum, this means that the three basic colors red, green and blue can be reproduced, such that the image sensor apparatus can generate a color image. For example, the first preset wavelength can be in a wavelength range from 650 nanometers to 800 nanometers, in particular at 700 nanometers, the green wavelength can be in a wavelength range between 500 nanometers and 570 nanometers, in particular at 546 nanometers, and the third preset wavelength can be in a wavelength range between 420 nanometers and 500 nanometers, in particular at 436 nanometers. By this embodiment, the advantage arises that a color image can be generated from the basic colors by the image sensor apparatus, wherein sufficient light with the preset wavelength can be collected for the respective sensor element by means of the carrier medium and the input and output coupling regions, such that image noise can be suppressed, and whereby an image can improve. Thus, an improved detection of light depending on color can be provided.

Preferably, it is provided that at least each two input coupling regions are formed as a cohesive input coupling region, wherein the deflection structures associated with the at least two input coupling regions are each provided as individual elements or are formed as a single multiplex deflection structure in the cohesive input coupling region. This means that at least two input coupling regions can coincide in a region of the carrier medium, thus for example the first and the second input coupling region, the first and the third input coupling region or the second and the third input coupling region. Alternatively, all of the three input coupling regions can also be arranged in the cohesive input coupling region. With the provision of the deflection structures in the cohesive input coupling region as respectively individual elements, it is meant that they can for example be incorporated in the carrier medium in different positions within the cohesive input coupling region. In some instances, they can be arranged one behind the other, that is one behind the other viewed from a direction of light incidence. Since the deflection structures can be frequency-selective, thus, the first preset wavelength can for example be deflected by the first deflection structure, which can be located on a surface in the carrier medium, and the second preset wavelength can pass the first deflection structure since the deflection structures are frequency-selective. Subsequently, the second preset wavelength can be deflected by the second deflection structure, which can be behind the first deflection structure in a direction of light incidence.

With multiplex deflection structure, optical gratings, in particular holographic gratings, are meant, which can diffract polychromatic light, although optical gratings are usually frequency-selective. They are referred to as multiplexed volume holographic gratings (briefly: MVHG) and can for example be provided by varying the periodicity of the grating structure of an optical grating or increasing a number of grating planes of the optical grating or by arranging multiple volume holographic gratings one behind the other.

By this embodiment, the advantage arises that even more area of the carrier medium can be used for collecting the preset wavelengths and thus more light can be provided to each sensor element for generating the intensity signal.

An embodiment provides that the respective deflection structures are formed frequency-selective and thus the first deflection structure deflects only light of the first preset wavelength and the second deflection structure deflects only light of the second preset wavelength. In particular, the third deflection structure can deflect only light of the third preset wavelength. That is, the respective deflection structure deflects only light of a predetermined wavelength such that it is coupled into the carrier medium. Therein, such a frequency selectivity or wavelength selectivity is a typical characteristic of holographic-optical elements, which use optical gratings as deflection structures for the light guidance. Now, if white light is for example incident on one of the respective input coupling regions from the environment, by the respective deflection structure, only that light portion of the light, thus a first portion of the light, with the predetermined wavelength can be deflected or diffracted at a certain diffraction angle by the respective deflection structure. Remaining portions or a second portion of the light with a wavelength different from the predetermined one are preferably not deflected or the less the greater the difference to the predetermined wavelength. Accordingly, other portions of the light, which deviate from the predetermined wavelength or optimum wavelength, can in particular propagate through the carrier medium in an unimpeded manner. Thereby, of the polychromatic light, which impinges on the respective deflection structure, a monochromatic light portion can in particular be split off. Advantageously, the deflection effect is maximum for the optimum wavelength and declines towards longer and shorter wavelengths, for example according to a Gaussian curve, or becomes weaker. Therein, the predetermined wavelengths, which the respective deflection structures deflect, differ from each other. That is, each of the deflection structures deflects light of a different wavelength. Thus, a first one of the different input coupling regions can for example be formed as a red filter and only deflect red light. In contrast, a second one of the different input coupling regions can for example be formed as a blue filter and thus only deflect blue light. Finally, a third one of the different input coupling regions can for example be formed as a green filter and thus only deflect green light. By this embodiment, the advantage arises that the deflection structures can act as color filters, which can divide the light to the appropriate sensor elements. However, since the deflection structures are not only arranged in front of the appropriate sensor elements, but can be arranged on an entire area of an image sensor, more light with the preset wavelength can be collected, whereby a resolution can be improved.

A further embodiment provides that a first color filter is arranged in front of the first sensor element and a second color filter is arranged in front of the second sensor element, wherein the first color filter is formed to only transmit light with the first preset wavelength, and wherein the second color filter is formed to only transmit light with the second preset wavelength. In particular, a third color filter can be provided in front of the third sensor element, which is formed to only transmit light with the third preset wavelength. In particular, the respective color filters can transmit red, green or blue light. In some instances, the sensor elements can be arranged in a matrix and the color filters can be arranged according to a Bayer pattern in front of the sensor elements. Therein, a respective color filter is frequency-selective, that is, only light of a predetermined wavelength can transmit to the respective sensor element via each color filter. For example, the color filters can be divided into categories, wherein a first category is only transparent to red light, a second category is only transparent to blue light and a third category is only transparent to green light. Color filters can for example be formed of dyed glass, plastic or gelatin foils. By this embodiment, the advantage arises that wavelength portions of a white light, which have not yet been deflected by one of the deflection structures, do not impinge on the respective sensor element, which is intended for a preset wavelength. Thus, a false detection of undesired wavelengths can be avoided, whereby an image signal of the image sensor apparatus can be improved.

A further embodiment provides that the first input coupling region is not arranged in front of the first sensor element and the second input coupling region is not arranged in front of the second sensor element. In particular, the third input coupling region cannot be arranged in front of the third sensor element. In other words, the first input coupling region can for example be arranged in front of the second sensor element and the second input coupling region can be arranged in front of the first sensor element. By this embodiment, the advantage arises that light with the preset first wavelength, which would impinge on the first sensor element anyway, is for example not deflected by the first deflection structure, but the light of the preset first wavelength, which would impinge on the second sensor element, can be redirected to the first sensor element via the first input and output coupling structure. This also applies to the second and the third sensor element. In particular, this embodiment is preferably to be applied with the above mentioned color filters. By this embodiment, the advantage arises that material can be saved in the generation of the deflection structures, whereby cost can be saved in the production of the image sensor apparatus.

A further embodiment provides that the input coupling regions and the output coupling regions are formed integrally with the carrier medium or wherein the carrier medium is formed as a separate element to the input coupling regions and the output coupling regions. In the first case, the input coupling region and the output coupling region can thus for example be directly incorporated in a surface structure of the carrier medium. Thus, the carrier medium itself can be formed, for example be etched or lasered, as a holographic-optical element. In the second case, the carrier medium can be formed separately from the input coupling region and the output coupling region. Therein, the input coupling region and the output coupling region can for example each form an element and the carrier medium can form another element, which abuts on the respective elements. Thus, the input coupling region and the output coupling region can be formed in at least one holographic-optical element. This allows a greater selection in using a carrier medium. For example, the input coupling region and the output coupling region can be formed in different sections of a holographic foil or plate. For attaching the foil or plate to the carrier medium, the foil or plate can be adhered to the carrier medium. Alternatively, the holographic foil can also be formed as an adhesive foil and directly, thus without adhesive, adhere to the surface of the carrier medium by molecular forces.

A further embodiment provides that the respective output coupling region has a smaller dimension than the respective input coupling region a larger dimension than the respective output coupling region, wherein a respective deflection structure has a collimation grating structure, which is formed to deflect light beams of the light to a different extent depending on the location of incidence such that the deflection structure collimates the light beams to the respective output coupling deflection structure. Correspondingly, the respective output coupling deflection structure can comprise a diverging grating structure or a collimation grating structure, which is formed to deflect light beams of the light to a different extent depending on the location of incidence and to parallelize or focus them onto the respective sensor element for coupling out of the carrier medium. In other words, a large input coupling region can be provided, which has a large entry area for light, wherein this light is collimated to a small output coupling region and thus in appropriate manner for the respective sensor element. A diverging grating structure can have an inhomogeneous diffraction structure, which can for example more severely diffract light beams from an edge of the diffraction structure than light beams from a center of the diffraction structure, whereby the light beams can be expanded. Accordingly, a collimation grating structure can have a grating structure, in which light beams can be focused according to impinging position. In this embodiment, the collimation grating structure and the diverging grating structure and the corresponding distances of the two structures may be selected such that the light beams diverge from the diverging grating structure to the collimation grating structure and are again parallelized by the collimation grating structure. This arrangement is comparable to a Galilei telescope, in which a converging lens and a diverging lens are arranged one behind the other such that the focal lengths of the two lenses coincide in a point behind the diverging lens. By this embodiment, the advantage arises that more light of the preset wavelength can be collected from a larger region and thus an intensity signal of the image sensor apparatus can be improved.

Further embodiments of the invention also include combinations of the features of the described embodiments.

BRIEF DESCRIPTION OF THE SEVERAL VIEWS OF THE DRAWINGS

In the following, embodiments of the invention are described.

DETAILED DESCRIPTION

The embodiments explained in the following are example embodiments of the invention. In the embodiments, the described components of the embodiments each represent individual features of the invention to be considered independently of each other, which also each develop the invention independently of each other. Therefore, the disclosure is to include also combinations of the features of the embodiments different from the illustrated ones. Furthermore, the described embodiments can also be supplemented by further ones of the already described features of the invention.

In the figures, identical reference characters each denote functionally identical elements.

Figure 1:
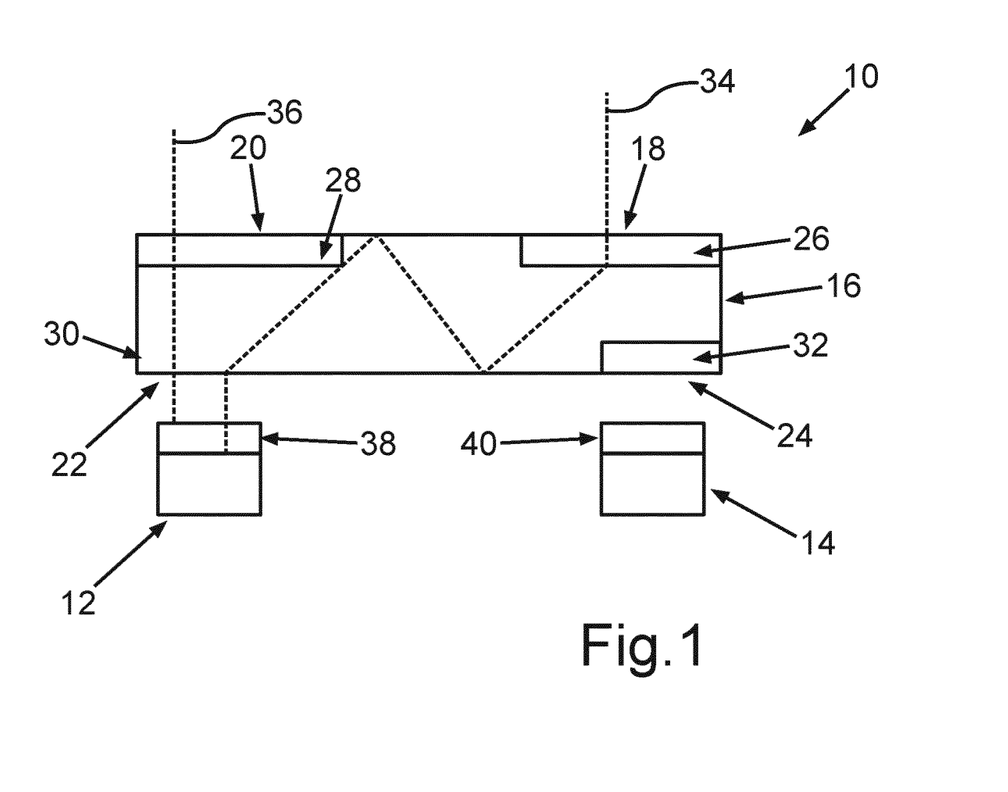
FIG. 1 shows a schematic representation of an image sensor apparatus according to an exemplary embodiment.

In FIG. 1, an image sensor apparatus 10 for detecting light according to an exemplary embodiment is schematically illustrated. The image sensor apparatus 10 can comprise a first sensor element 12 and a second sensor element 14, which are each formed to generate an intensity signal upon detection of light. For example, the first and the second sensor element can include a photodiode.

The first and the second sensor element 12, 14 can be arranged on an area as a part of an image sensor of the image sensor apparatus 10. For example, the image sensor can be a part of a camera, which is formed to generate an image, in particular a color image. In this embodiment, the first sensor element 12 and the second sensor element 14 are illustrated spaced from each other, however, they can also be arranged next to each other in form-fit manner. An extensive, three-dimensional arrangement, that is in a plane with multiple sensor elements, can also be provided. However, for explaining the functionality of the image sensor apparatus 10, only the two sensor elements 12, 14 are illustrated in this embodiment.

Further, the image sensor apparatus 10 includes a carrier medium 16, which is formed as a light guide and arranged on a detector surface of the sensor elements 12, 14. In this embodiment, the carrier medium 16 is arranged spaced from the sensor elements 12, 14, however, the sensor elements 12, 14 can also abut on the carrier medium 16 in form-fit manner.

The carrier medium 16 can comprise a first input coupling region 18 and a second input coupling region 20. Further, the carrier medium 16 can comprise a first output coupling region 22 and a second output coupling region 24.

The first input coupling region 18 can comprise a first deflection structure 26, which is formed to couple light with a first preset wavelength, which is incident on the first input coupling region 18 from an environment, into the carrier medium 16 towards the first output coupling region 22. In similar manner, the second input coupling region 20 can comprise a second deflection structure 28, which is formed to couple light with a preset second wavelength into the carrier medium 16 towards the second output coupling region 24. Within the carrier medium 16, the input coupled light can then be forwarded to the respective output coupling regions 22, 24 by internal reflection. This means that the carrier medium 16 can pass the light from the input coupling regions to the respective output coupling regions parallel to a detector surface of the sensor elements 12, 14.

The first output coupling region 22, which may be arranged in front of the first sensor element 12, can comprise a first output coupling deflection structure 30, which is formed to couple the light of the first preset wavelength transferred in the carrier medium 16 out of the carrier medium onto the first sensor element 12. Correspondingly, the second output coupling region 24 can comprise a second output coupling deflection structure 32, which is formed to couple the transferred light with the second preset wavelength, which is incident on the second output coupling region, in particular on the second output coupling deflection structure 32, out of the carrier medium 16 onto the second sensor element 14.

The respective deflection structures 26, 28, 30, 32 can for example be formed as an optical grating by way of a holographic element, in particular as a volume holographic grating or surface holographic grating.

For example, the carrier medium 16 can be formed by way of a layered construction, wherein light guiding elements, such as for example glass or plastic plates, form cover layers for a holographic-optical element, that is for the deflection structures 26, 28, 30, 32. Alternatively or additionally, the holographic-optical element can be generated by stacking multiple holographic-optical elements.

The deflection structures as the holographic-optical elements can for example be formed by way of a photopolymer foil or a glass, which is introduced, preferably adhered, between cover layers of the carrier medium 16. Further, the holographic-optical element can be formed by holographic exposure methods such that the deflection structures 26, 28, 30, 32 form, such as for example the volume holographic grating or the surface holographic grating.

In the following, the functionality of the image sensor apparatus 10 is to be described. For example, light 34 can impinge on the image sensor apparatus 10 from an environment, in particular on the first input coupling region 18, which is illustrated by a dashed line in FIG. 1. The light 34 can for example include the first preset wavelength, such as for example a red wavelength portion, which impinges on the first deflection structure 26. The first deflection structure 26 can be formed as a surface holographic grating, wherein it is frequency-selective and thus can only deflect the first preset wavelength portion to couple it into the carrier medium 16 towards the first output coupling region 22. Here, towards the output coupling region means a macroscopic direction from the input coupling region along the carrier medium 16 to the output coupling region, or a direction vector in the propagation direction of the light by internal reflections. Forwarding by way of internal reflection means that the input coupled light beams satisfy a critical angle condition of the total reflection. Herein, a light path can of course have a zigzag course due to the internal reflection.

If the input coupled light with the first preset wavelength impinges on the first output coupling deflection structure 30, it can couple the light with the first preset wavelength out of the carrier medium 16 such that it can be detected by the first sensor element 12. Therein, the first output coupling deflection structure 30 can also be formed as a surface holographic grating, which frequency-selectively deflects the first preset wavelength. Advantageously, a holographic grating like the first output coupling deflection structure 30 can also be angle-sensitive, this means that only the light of the first preset wavelength, which comes from the direction of the first input coupling region within the carrier medium 16, is deflected. This has the advantage that light 36, which would directly impinge on the first sensor element 12, is for example not or only slightly deflected by the first output coupling deflection structure 30. Since the light 36 in the second input coupling region 20 is incident on the second output coupling structure, in this light, only the portion of the second preset wavelength is correspondingly deflected into the carrier medium 16, which is not illustrated here for better clarity.

However, the light 36, which can for example be white light, can also have further wavelength portions besides the first and the second preset wavelength. Therefore, the first sensor element 12 can comprise a first color filter 38, which transmits only the light with the first preset wavelength and absorbs other wavelength portions. Thus, the first sensor element 12 can generate an intensity signal, which only originates from the first preset wavelength. In corresponding manner, the second sensor element 14 can comprise a second color filter 40, which allows only light with the second preset wavelength to pass.

In some instances, the respective input coupling regions 18, 20 can have a larger dimension than the respective output coupling regions 22, 24. This means that an area, on which the light can impinge, can be larger than the respective output coupling region and thereby the respective sensor element, whereby more light can be collected for detection. Hereto, the respective deflection structure 26, 28 can have a collimation grating structure, which is formed to deflect the light beams of the respective preset wavelength to a different extent depending on the location of incidence, such that the light beams are focused onto the output coupling deflection structure 30, 32 after passage through the carrier medium 16. Thus, a higher portion of light is available for detection, which can improve an intensity signal.

Figure 2:
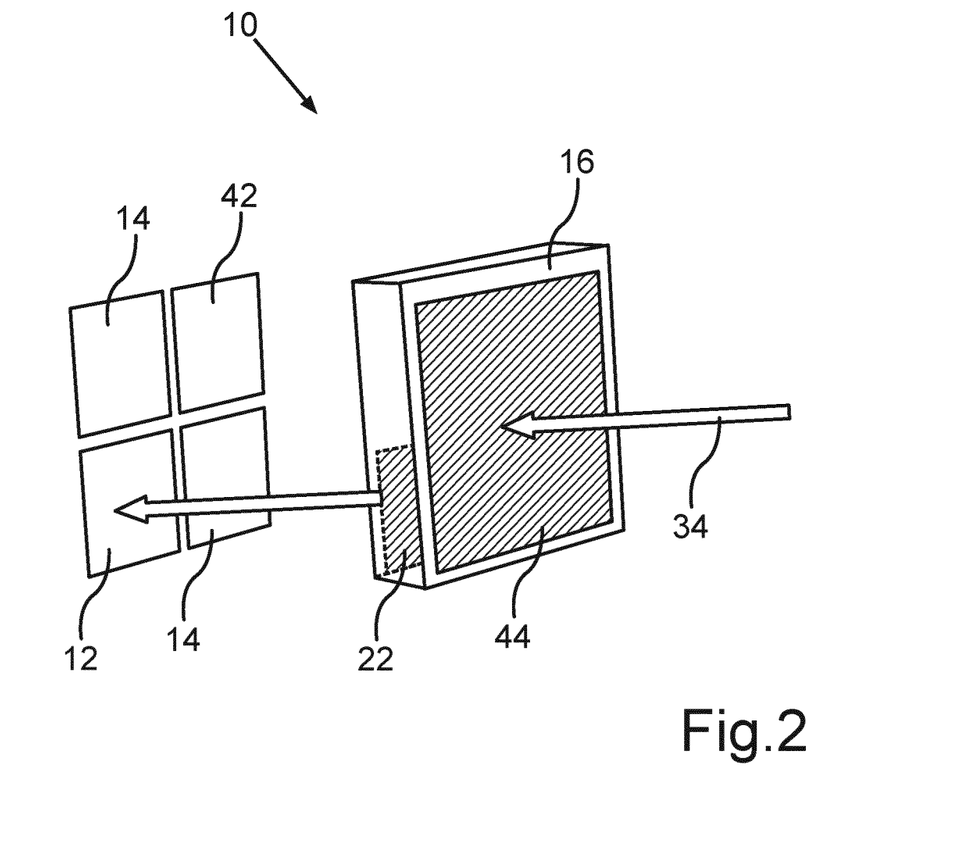
FIG. 2 shows a perspective representation of an image sensor apparatus according to an exemplary embodiment.

In FIG. 2, a perspective view of an exemplary image sensor apparatus 10 according to an exemplary embodiment is illustrated. In this embodiment, the first sensor element 12 can be formed to detect red light as the first preset wavelength. In addition, the second sensor element 14 can be formed to detect the second preset wavelength, in this embodiment green light, wherein two second sensor elements 14 can be provided. Furthermore, a third sensor element 42 can be provided, which is formed to detect a third preset wavelength, in this case blue light. The sensor elements can be rectangularly arranged in a 2×2 matrix as a part of an image sensor, wherein the 2×2 matrix can only represent a section of the image sensor. In particular, the sensor elements can be arranged corresponding to a Bayer pattern, such that a color image can be reconstructed from the detected wavelengths.

In this embodiment, a cohesive input coupling region 44 can reach over an entire area of the carrier medium 16, wherein multiple input coupling regions can each be combined in the cohesive input coupling region 44. Hereto, the first input coupling region 18, the second input coupling region 20 and a third input coupling region can for example coincide in the cohesive input coupling region, wherein deflection structures of the respective input coupling regions are for example arranged one behind the other in the carrier medium 16. The deflection structures associated with the respective input coupling region can preferably also be formed as a single multiplex deflection structure. This means that multiple optical gratings can be interlaced with each other by varying the periodicity of the grating structure and thus only those preset wavelength portions are coupled into the carrier medium 16, which correspond to the wavelength preset by the grating planes.

For example, light 34, which for example includes red light as the first preset wavelength and which is incident on the cohesive input coupling region 44, can be coupled into the carrier medium 16 corresponding to the wavelength preset by the multiplex deflection structure such that it is collimated onto the first output coupling region 22, where the first output coupling deflection structure 30 can radiate the portion of the red light onto the first sensor element 12. That is, the cohesive input coupling region 44 acts as a first deflection structure for red light. In addition, the previously described collimation grating structure can also be used besides the multiplex deflection structure to collimate the light to the first output coupling region 22 smaller compared to the cohesive input coupling region 44. Further, green and blue wavelength portions (not shown) can for example also be deflected onto the corresponding sensor elements 14, 42.

Figure 3:
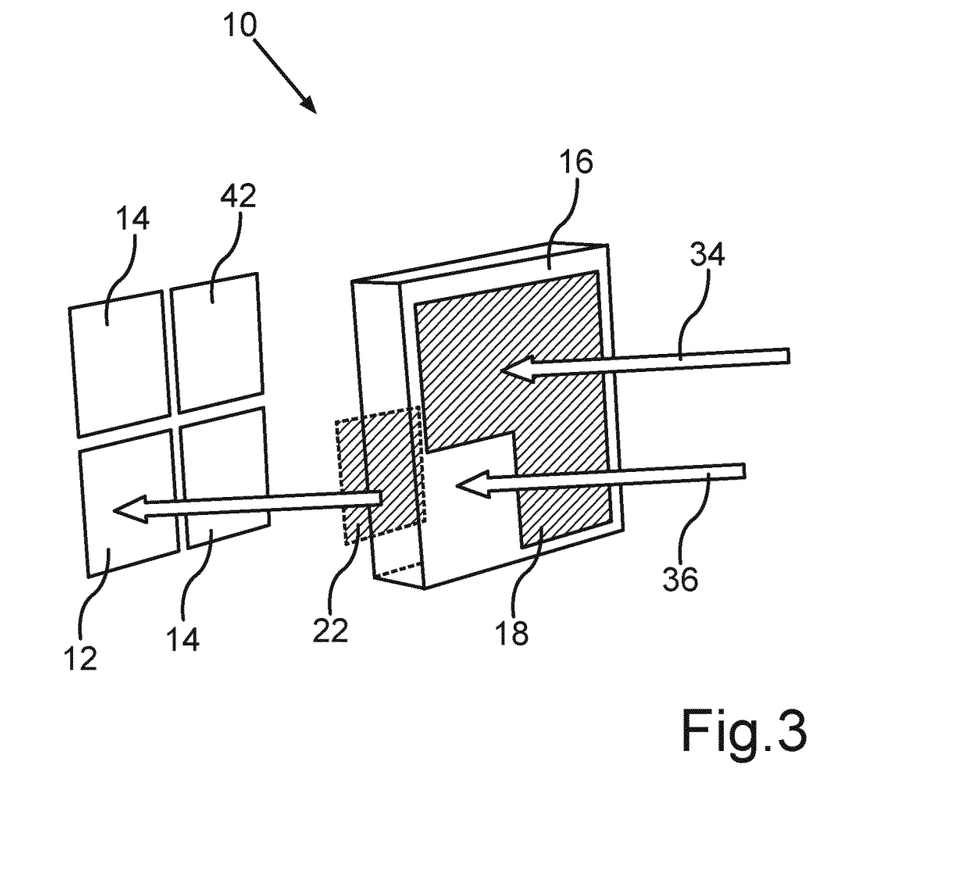
FIG. 3 shows a perspective representation of an image sensor apparatus according to a further exemplary embodiment.

In FIG. 3, a further exemplary embodiment of the image sensor apparatus 10 is illustrated in perspective. In this embodiment, the sensor elements as a part of an image sensor can be arranged the same way as in FIG. 2. In this embodiment, a surface of the carrier medium 16 can include the first input coupling region 18. In particular, the first input coupling region 18 can deflect the light 34, which is incident on the first input coupling region 18, onto the first output coupling region 22 via the carrier medium 16 corresponding to the previously mentioned embodiments, such that the red wavelength portion can be coupled out onto the first sensor element 12.

However, in this embodiment, it can be provided that the carrier medium 16 does not comprise a first input coupling region with the first deflection structure in front of the first sensor element 12. Thus, light 36, which impinges on this region, can directly get onto the first sensor element 12 through the carrier medium 16. However, it can in particular be provided that the deflection structures for the second and the third input coupling region are provided (not shown) at the location of the carrier medium 16, at which there is no first input coupling region. However, since the deflection structures are preferably formed as a holographic grating, the deflection structures are frequency-selective, this means that the preset first wavelength, which means the red light, is not deflected and can directly pass onto the sensor element 12. In addition, the holographic gratings can be angle-selective, whereby the first output coupling deflection structure of the first output coupling region 22 either does not deflect the red wavelength portion of the light 36 from the direct path into the first sensor element 12. Thus, it can be achieved that the respective wavelength portions reach the sensor element intended for them.

Figure 4:
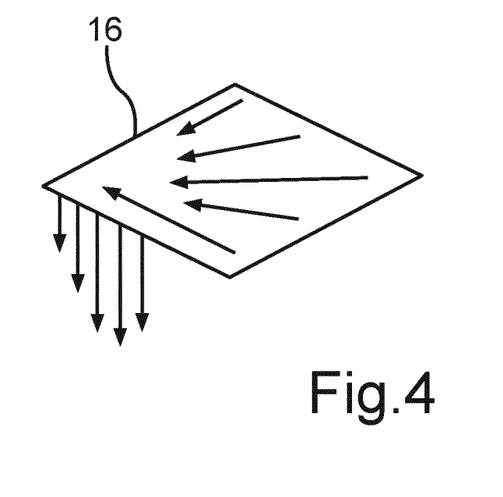
FIG. 4 shows a schematic representation of a light guidance within a carrier medium according to an exemplary embodiment.
Figure 5:
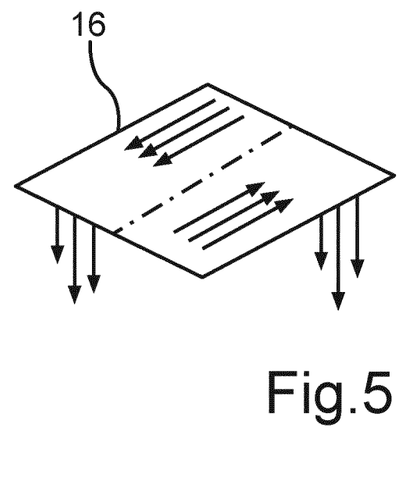
FIG. 5 shows a schematic representation of a light guidance within a carrier medium according to a further exemplary embodiment.

In FIGS. 4 and 5, it is for example illustrated how a light guidance by way of internal reflection within the carrier medium 16 can be achieved for a previously shown image matrix of sensor elements for red, green and blue wavelengths. For example, for red and blue portions, for which each only one sensor element can be provided in the 2×2 matrix in a Bayer pattern, the light guidance according to FIG. 4 can be provided. This means that light, which is incident on a respective input coupling region on the surface of the carrier medium 16, can be diagonally passed into the corresponding field of the output coupling region, from where it can be coupled out of the carrier medium 16 onto the corresponding sensor element for red or blue light.

Since each two sensor elements can be provided in the 2×2 matrix in the Bayer pattern for the detection of green light, the input coupling region with the deflection structure for green light can be provided twice on a surface of the carrier medium 16, wherein the green light can then be guided in the carrier medium 16 to the output coupling regions for green light by means of internal reflection parallel and opposed to each other in the respective input coupling regions, which is for example illustrated in FIG. 5.

In another exemplary embodiment, an aspect is in that a light guide (carrier medium 16) with a holographic-optical element (the deflection structures) is overlaid on a color filter pattern of sensor elements, which collects otherwise unused red, green or blue light depending on the desired wavelengths and guides it to the individual pixels (the sensor elements).

Hereto, the light guide can for example include multiple individual holographic-optical elements, for example three pieces for red, yellow and blue, or a holographic-optical element with multiplex exposure (multiplexing). In addition, the holographic-optical element can comprise at least each one input coupling as well as output coupling deflection structure.

Thus, each pixel can obtain light from an entire pixel area. Thus, an "active" area increases in the Bayer pattern for example for green by a factor of 2, red and blue each by a factor of 4.

This can be achieved in that an image sensor apparatus 10, for example a camera sensor, with m×n pixels is provided, wherein m×n color filters are lying on the pixels, preferably red, green and blue color filters according to a Bayer pattern. Further, a transparent light guide (carrier medium 16) with at least one holographic-optical element and at least two exposures can be provided, one for input coupling and one for output coupling. However, at least three holographic-optical elements or three exposures can be provided in at least one holographic-optical element for input coupling of red, green and blue light. It can also be provided that recesses are provided in the input coupling holographic-optical element for the pixels to be coupled out.

Overall, the examples show how a camera sensor with a holographic-optical element for increasing an active pixel area can be provided.

Again, various features of the embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An image sensor apparatus of a camera for detecting light, comprising:
   at least a first and a second sensor element, which are formed to generate a respective intensity signal from detected light;
   a carrier medium, which is arranged in front of the first and the second sensor element;
   wherein the carrier medium is formed as a light guide and comprises at least a first and a second input coupling region and at least a first and a second output coupling region;
   wherein the first input coupling region comprises a first deflection structure, which is formed to couple light with a first preset wavelength, which is incident on the first input coupling region from an environment, into the carrier medium towards the first output coupling region;
   wherein the second input coupling region comprises a second deflection structure, which is formed to couple light with a second preset wavelength, which is incident on the second input coupling region from the environment, into the carrier medium towards the second output coupling region;
   wherein the carrier medium is formed to transfer the light coupled in via the input coupling regions to the output coupling regions by internal reflection;
   wherein the first output coupling region is arranged in front of the first sensor element and the second output coupling region is arranged in front of the second sensor element;
   wherein the first output coupling region comprises a first output coupling deflection structure, which is formed to couple the transferred light with the first preset wavelength, which is incident on the first output coupling region, out of the carrier medium onto the first sensor element; and
   wherein the second output coupling region comprises a second output coupling deflection structure, which is formed to couple the transferred light with the second preset wavelength, which is incident on the second output coupling region, out of the carrier medium onto the second sensor element.

2. The image sensor apparatus according to claim 1, wherein the respective deflection structures are formed as a holographic element with at least one optical grating, in particular a volume holographic grating or a surface holographic grating.

3. The image sensor apparatus according to claim 1, wherein at least a third sensor element and a third input coupling region with a third deflection structure are provided, which is formed to couple light with a third preset wavelength into the carrier medium towards a third output coupling region, wherein the third output coupling region comprises a third output coupling deflection structure, which is formed to couple the transferred light with the third preset wavelength, which is incident on the third output coupling region, out of the carrier medium onto the third sensor element, wherein the third output coupling region is arranged in front of the third sensor element.

4. The image sensor apparatus according to claim 3, wherein the first preset wavelength is in a red color spectrum, the second preset wavelength is in a green color spectrum and the third preset wavelength is in a blue color spectrum.

5. The image sensor apparatus according to claim 3, wherein at least each two input coupling regions are formed as a cohesive input coupling region, wherein the deflection structures associated with the at least two input coupling regions are provided as respectively individual elements or are formed as a single multiplex deflection structure in the cohesive input coupling region.

6. The image sensor apparatus according to claim 1, wherein the respective deflection structures are formed frequency-selective, and thus the first deflection structure deflects only light of the first preset wavelength and the second deflection structure deflects only light of the second preset wavelength.

7. The image sensor apparatus according to claim 1, wherein a first color filter is arranged in front of the first sensor element and a second color filter is arranged in front of the second sensor element, wherein the first color filter is formed to only transmit light with the first preset wavelength, and wherein the second color filter is formed to only transmit light with the second preset wavelength.

8. The image sensor apparatus according to claim 1, wherein the first input coupling region is not arranged in front of the first sensor element and the second input coupling region is not arranged in front of the second sensor element.

9. The image sensor apparatus according to claim 1, wherein the input coupling regions and the output coupling regions are formed integrally with the carrier medium or wherein the carrier medium is formed as a separate element to the input coupling regions and the output coupling regions.

10. The image sensor apparatus according to claim 1, wherein the respective input coupling region has a larger dimension than the respective output coupling region, wherein a respective deflection structure has a collimation grating structure, which is formed to deflect light beams of the light to a different extent depending on the location of incidence, such that the deflection structure collimates the light beams onto the respective output coupling deflection structure.

* * * * *